(12) United States Patent
Cragun et al.

(10) Patent No.: US 8,640,252 B2
(45) Date of Patent: Jan. 28, 2014

(54) OBFUSCATING ENTRY OF SENSITIVE INFORMATION

(75) Inventors: Brian John Cragun, Rochester, MN (US); Marc Kevin Johlic, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/465,116

(22) Filed: May 7, 2012

(65) Prior Publication Data

US 2013/0298246 A1 Nov. 7, 2013

(51) Int. Cl.
*H04L 9/00* (2006.01)

(52) U.S. Cl.
USPC .......................................................... 726/26

(58) Field of Classification Search
USPC .......................................................... 726/26
See application file for complete search history.

(56) References Cited

U.S. PATENT DOCUMENTS

| | | | |
|---|---|---|---|
| 6,464,135 B1 | 10/2002 | Cohen et al. | |
| 7,526,316 B2 | 4/2009 | Shimuzu | |
| 7,616,764 B2 | 11/2009 | Varghese et al. | |
| 7,653,818 B2 | 1/2010 | Serpa | |
| 7,735,121 B2 | 6/2010 | Madani | |
| 7,836,508 B2 * | 11/2010 | Gumpel et al. | 726/26 |
| 7,882,361 B2 | 2/2011 | Williams | |
| 7,992,007 B2 | 8/2011 | Lazzaro et al. | |
| 2005/0162402 A1 | 7/2005 | Watanachote | |
| 2006/0056626 A1* | 3/2006 | Keohane et al. | 380/206 |
| 2011/0016520 A1 | 1/2011 | Cohen et al. | |
| 2011/0277037 A1* | 11/2011 | Burke et al. | 726/26 |
| 2012/0079282 A1* | 3/2012 | Lowenstein et al. | 713/189 |
| 2013/0111597 A1* | 5/2013 | Gossweiler et al. | 726/26 |

* cited by examiner

*Primary Examiner* — Matthew Smithers
(74) *Attorney, Agent, or Firm* — Garg Law Firm, PLLC; Rakesh Garg; John D. Flynn

(57) ABSTRACT

A method, system, and computer program product for obfuscating entry of information are provided in the illustrative embodiments. A set of additional aspects to be applied to a part of an input is communicated to a provider of the input. The set of additional aspects is distinct from a second set of additional aspects to be applied to another input. An obfuscated input corresponding to the part of the input is received. A subset of the set of additional aspects is present in the obfuscated input. The part of the input from the obfuscated input is recovered by removing, using a processor and a memory, the subset of the set of additional aspects from the obfuscated input. An entry field input corresponding to the input is generated. The entry field input is sent to an application executing in a data processing system.

23 Claims, 6 Drawing Sheets

OBFUSCATING ENTRY OF SENSITIVE INFORMATION

BACKGROUND

1. Technical Field

The present invention relates generally to a method, system, and computer program product for data input. More particularly, the present invention relates to a method, system, and computer program product for obfuscating the entering of sensitive information.

2. Description of the Related Art

Many applications, executing on a variety of computing devices or data processing systems, require user input. Often, a user input is a data entry into a data entry field (entry field) specified for receiving that user input.

The entry filed may be an input field in a form, document, database, or any other application where a user input can be accepted. The data processing system executing such an application can be a commonly available computer, remote terminal, or portable device. For example, a computer can execute a spreadsheet application, which can accept data—a user input—in a spreadsheet cell—the entry field. As another example, a smartphone can execute an application that accepts a password—a user input—in a password field—the entry field.

The user can provide the inputs in a variety of ways. For example, a user can use a keyboard to type text in the entry field. As another example, the user can speak into a microphone associated with the data processing system to speak the input, which is then converted, to text and inserted in the entry field. As another example, a user can gesture relative to the data processing system, with or without a pointing device, the gesture being interpreted as a user input. The gesture is then translated into text for data entry into the entry field.

SUMMARY

The illustrative embodiments provide a method, system, and computer program product for obfuscating entry of information. An embodiment communicates to a provider of an input a set of additional aspects to be applied to a part of the input, wherein the set of additional aspects is distinct from a second set of additional aspects to be applied to another input. The embodiment receives an obfuscated input corresponding to the part of the input, wherein a subset of the set of additional aspects is present in the obfuscated input. The embodiment recovers the part of the input from the obfuscated input by removing, using a processor and a memory, the subset of the set of additional aspects from the obfuscated input. The embodiment generates an entry field input corresponding to the input. The embodiment sends the entry field input to an application executing in a data processing system.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
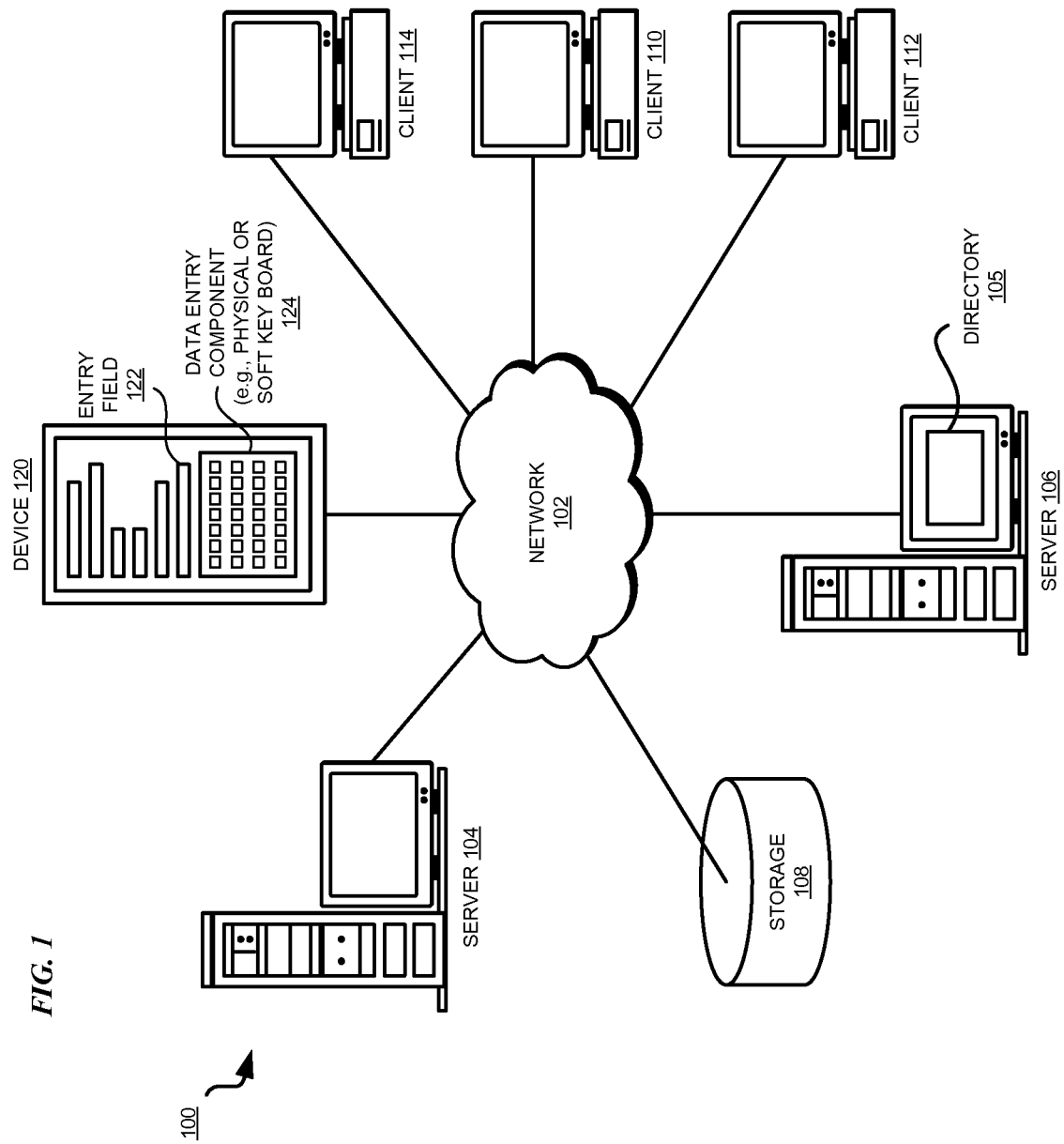
FIG. 1 depicts a pictorial representation of a network of data processing systems in which illustrative embodiments may be implemented.

Within the context of the illustrative embodiments described herein, a data processing system that accepts a voice input from a user is assumed to be configured with a voice capturing device, such as a microphone. Similarly, within the context of the illustrative embodiments described herein, a data processing system that provides audible information to a user is assumed to be configured with an audio output device, such as a speaker, an earpiece, or a headset, via a wired or wireless coupling.

A voice entry is a sound pattern that can eventually be converted into text using an embodiment. The act of performing voice entries is a manner in which a voice entry is provided to a data processing system. Unless otherwise specified, the voice entry can include human generated sound patterns, machine generated sound patterns, sounds in human-audible range, ultra-high or ultra-low frequency sounds, or a combination thereof. Within the context of an embodiment, unless an entry is specified as a voice entry, the entry is contemplated to be a textual entry, provided by pressing or making a gesture relative to a physical or software-generated key, button, icon, graphic, text, or a comparably usable user interface for making textual entries.

The illustrative embodiments recognize an increasing trend towards using data processing systems, such as portable computing devices and mobile phones, for entering and receiving information in public places. Often, a user inputs information into a data processing system in circumstances where the data entry is subject to overt or covert observation. For example, a person typing a password into a smartphone may be subject to an observer or a camera observing the device's screen during the typing, the person's finger placement and movements, or a combination thereof.

The illustrative embodiments further recognize that such undesirable observation is an even bigger problem for individuals with disabilities. For example, a blind person cannot tell whether others are actually observing or are sufficiently close for observing the person's device or gestures. A person with vision impairment may need a high contrast in large font setting, making their entries more visible to an observer.

The illustrative embodiments further recognize that individuals in public (for example, when using a mobile device) may not always be able to physically or visibly interact with the device and may need to use voice entry and listen to audible output to complete an interaction. Such interactions put an individual at risk of inadvertently disclosing sensitive information.

Previous attempts to protect sensitive data include "password" entry fields, which replace content with one or more asterisks per character. However the illustrative embodiments recognize that the password fields are rarely used as other data entry fields, and are typically controlled by the application that is unaware of circumstances of the data entry. Thus sensitive fields such as credit card numbers and social security numbers remain unobscured in most applications in unsecure data entry environments.

As another example, certain prior art devices provide a setting that allows a user to interact with an application using only a blank screen and audio read-back provided by an application to the user. The read-back informs the user of the invisible keys underlying the user's finger as the user passes the finger over those invisible keys. The user typically hears the read-back privately through headphones. The illustrative embodiments recognize that this method is also not sufficiently successful in obfuscating data entry of sensitive information because studies suggest that careful observers can infer the buttons that were pressed by observing the placement of the user's finger.

What is needed is a way to enter information that obfuscates the information during data entry so that the information is not discernible or repeatable by direct or indirect observations. Particularly, entry of sensitive information, in settings where the data entry is susceptible to observation, can benefit from an embodiment.

Personal information, data security information, authentication information, medical information, and many other categories of information are widely regarded as sensitive information. However, the illustrative embodiments are not intended to be limited on only that information or data that is commonly regarded as sensitive information. For example, information about a person's age may be sensitive information to that person, but not to others. Generally, within the scope of the illustrative embodiments, any information can be regarded as sensitive information whose entering can benefit from an embodiment.

The illustrative embodiments used to describe the invention generally address and solve the above-described problems and other problems related to making data entries in situations susceptible to undesirable observation. The illustrative embodiments provide a method, system, and computer program product for obfuscating entry of information.

The illustrative embodiments are described with respect to certain inputs and conversions only as examples. Such descriptions are not intended to be limiting on the invention. For example, an illustrative embodiment described with respect to obfuscating a character by selecting a predetermined different character or input can be implemented with respect to another manner of obfuscating a character entry without limitation.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
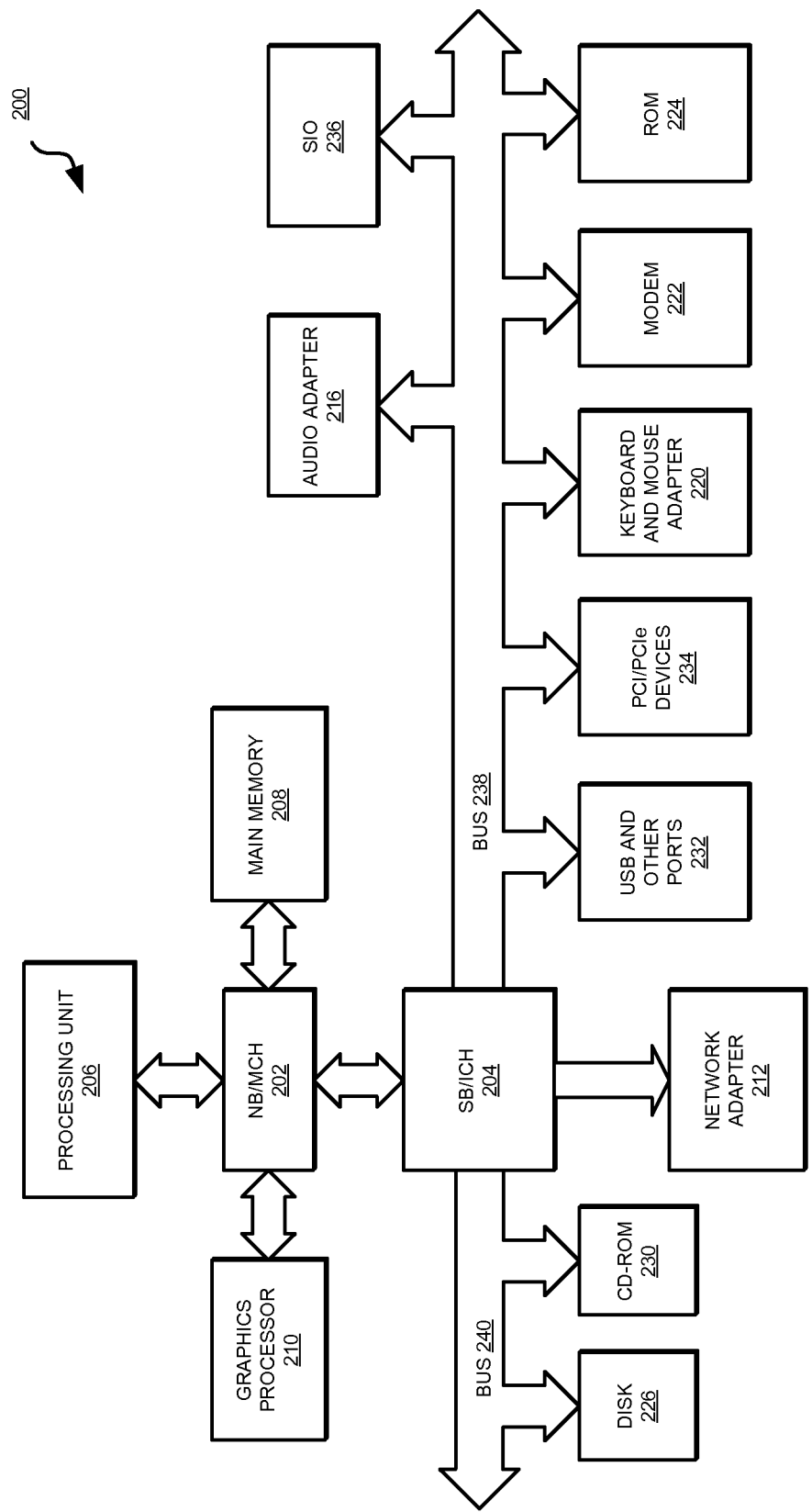
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Device 120 is an example portable device that connects to network 102. Any of servers 104 and 106, any of clients 110, 112, and 114, or device 120 that accepts voice entries is equipped with a voice capturing device (not shown), such as a microphone. Any of servers 104 and 106, any of clients 110, 112, and 114, or device 120 that outputs audible messages is equipped with an audio output device (not shown), such as a wired or wireless earpiece coupled therewith. As an example, device 120 includes an application (not shown) that presents a form including entry field 122. Data entry component 124 is any type of data entry mechanism for providing textual data. The textual data provided using data entry component 124 forms an obfuscated entry that is converted via a deobfuscation method of an embodiment into input data for entry field 122 according to an embodiment. An application implementing an embodiment executes in device 120.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a sever data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202, and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard dish drive (HDD) 226 and CD-ROM 230 are coupled to South Bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204.

An operating system runs on processing unit 206. The operating system coordinates and provides control of various components within data processing system 200 in FIG. 2. The operating system may be a commercially available operating system such as Microsoft™ Windows™ (Microsoft and Windows are trademarks of Microsoft Corporation in the United States, other countries, or both), or Linux™ (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM. Audio adapter 216 is usable for accepting voice entry, providing audio output, or a combination thereof.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
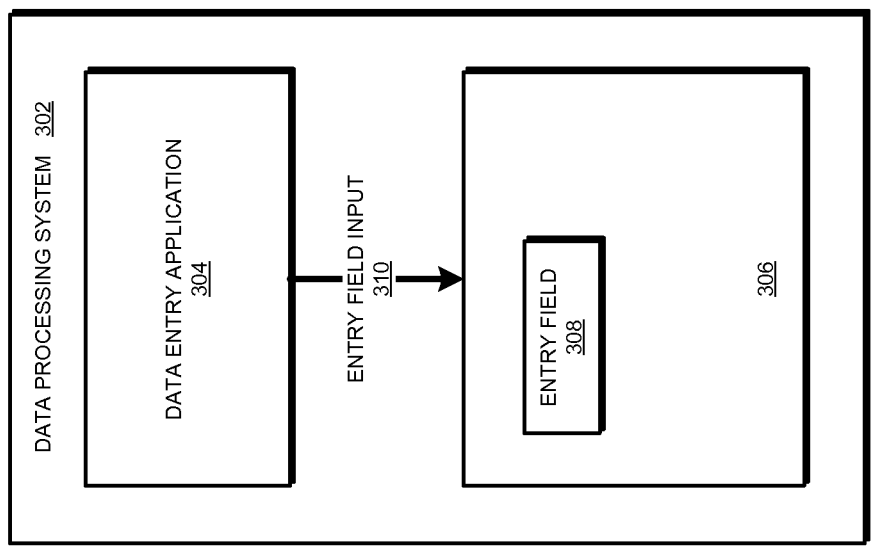
FIG. 3 depicts a block diagram of an example configuration for obfuscating data entry of sensitive information in accordance with an illustrative embodiment.

With reference to FIG. 3, this figure depicts a block diagram of an example configuration for obfuscating data entry of sensitive information in accordance with an illustrative embodiment. Data processing system 302 is similar to any of servers 104 and 106, clients 110, 112, and 114, or device 120 in FIG. 1. Only as an example, and without implying any limitation of an illustrative embodiment thereto, data processing system 302 is depicted in a manner similar to device 120 in FIG. 1.

A user (not shown) provides textual data entry input (not shown) to data processing system 302 via a data entry component (not shown), which is similar to data entry component 124 in FIG. 1. Data processing system 302 includes data entry application 304, which implements an embodiment. Another application 306 executing in data processing system 302 presents entry field 308. Entry field 308 is to be populated with entry field input 310 in such a manner that an undesirable observer can, at most observe the obfuscated input, gestures for providing the obfuscated input, voice entry of all or past of an obfuscated input, or a combination thereof, but application 306 receives deobfuscated data corresponding to obfuscated input of the user.

Operating in accordance with an illustrative embodiment, data entry application 304 includes a process that converts the user provided obfuscated entry into deobfuscated data expected by application 306 from entry field 308. As an example, entry field 308 is selected for data entry by the user or by a process in data processing system 302. A combination of obfuscation methods is selected for obfuscating the data input to be received into data entry application 304 from the user. Consequently, a deobfuscation method is formed corresponding to the combination of obfuscation methods to derive entry field input 310 from the obfuscated input.

An obfuscation method is logic according to which a user obfuscates all or part of the input while providing the input. In other words, an obfuscation method adds an additional aspect to the intended input (entry field input 310) to obfuscate the intended input such that (i) the obfuscated input bears no resemblance to the intended input, (ii) the gestures used for providing the obfuscated input bear no resemblance to the gestures expected for providing the intended input, or (iii) both (i) and (ii). Conversely, a deobfuscation method is logic for removing such additional aspect from the obfuscated input, and recovering the intended input data in deobfuscated form to provide as entry field input 310 to application 306.

Assume, for example, that an example obfuscation method is to reorganize the data entry component, a virtual keyboard, such that the keys on the keyboard are in non-standard locations. Another obfuscation method requires double tapping certain characters for those characters to be accepted. Once the user sees the reorganized keyboard, and received the double tapping instructions for designated characters, such as via an audio message through an earpiece, the user can obfuscate the input as follows. As an example, suppose the intended input is "UNITED". Further suppose that according to an obfuscation method, the letter "U" has been positioned in the location of the letter "Q" on a QWERTY keyboard, the letter "N" has been positioned in the location of the letter "A" on a QWERTY keyboard, the letter "I" has been positioned in the location of the letter "F" on a QWERTY keyboard, the letter "T" has been positioned in the location of the letter "Z" on a QWERTY keyboard, the letter "E" has been positioned in the location of the letter "X" on a QWERTY keyboard, and the letter "D" has been positioned in the location of the letter "M" on a QWERTY keyboard,. Further suppose that according to another obfuscation method, the letter "T" must be double tapped for it to be recognized by data entry application 304 as the letter "T".

To enter "UNITED", the user now enters U (observed as a single tap at Q location), N (observed as a single tap at A location), I (observed as a single tap at F location), T (observed as a ZZ due to double tap at Z location), E (observed as a single tap at X location), and D (observed as a single tap at M location).

To an undesirable observer, the user appears to have entered "QAFZZXM" instead of "UNITED". Without the benefit of the knowledge of the keyboard layout at the time of data entry (where the keyboard layout can change from one entry to the next), and without the knowledge of the double tapping obfuscation method (where double tapping characters can change from entry to entry), the observer is highly unlikely to be able to infer the intended input of "UNITED" from the user's actions.

In one embodiment, a keyboard presents not only letter keys but also word keys that represent whole words that may be selected from a standard or custom dictionary. Furthermore, an embodiment can apply the multi-tap obfuscation to certain letters or whole words as described above. Another embodiment may not announce a multi-tap requirement for accepting certain letters or words a priori, but only after the letter or word key has been pressed at least once.

Other obfuscation methods can similarly be employed, alone or in combination with each other. For example, another obfuscation method can reorganize the keyboard and also blackout the screen, so that even the reorganized keyboard is not visible to an observer but the reorganized letters or words are read-out to the user via a discrete audio message as the user's fingers pass over the invisible keys.

Another example obfuscation method can read-out letters and numbers to the user via a discrete audio message allowing the user to tap the data entry component anywhere when the user hears the letter or number the user intends to use. To the observer, the user simply appears to be tapping a screen with no idea as to why the tapping is being done or the text it represents.

Another example obfuscation method can randomly map one character or word to another replacement character or word and inform the user to type the replacement character. Even direct observation of the typing or speaking of the obfuscated input would be misleading to an observer, because, for example, "1" could represent "F", "h" could represent "7", "A" could represent "Y", "R" could represent "D", and so on. As another example, when a user taps the letter "U", an audio output via an earpiece informs the user that the "U" key represents the word "BUSINESS". Furthermore, only the user would know the mapping, the mapping can be just-in-time mapping (i.e., mapping created or revealed only upon use), and the mapping could change from entry to entry from one part of an entry to another part of the same entry.

Another example obfuscation method requires a combination of tactile input and voice entry to input different parts of an entry. For example, letter "U" has to be found and pressed, but the word "NIGHT" has to be pressed for the letter "N", and the word "FIST" has to be spoken for the letter "I".

Another example obfuscation method can inform the user that certain characters require additional key presses. For example, some characters can require double taps, others can require triple taps, some characters require certain timing between double taps on them, some others can require that the volume up button be held simultaneously with the key press, another character could require that the volume down button be held prior to the character's key press and released during the key press, another character could require that another character or location on the data entry component, such as an edge, be pressed simultaneously, and soon. Alternately, a spoken key word, such as "predecessor", could be provided by the user as a voice entry to further modify a part of a textual input. Any combination of these and other variations of key presses or voice entries can be used to create an obfuscation method.

Another example obfuscation method can inform the user that certain characters require multi-finger touches. For example, some characters can require that the key be pressed with two fingers, others can require a three-finger touch, some characters require touch by only certain fingers, some others can require that two fingers be swiped across the key instead of pressing the key, another character could require that the touch draw a pattern on the key—such as mark an X on the key of the character, and so on. Any combination of these and other variations of touch gestures can be used to create an obfuscation method.

Additionally, an observer having gained access to the data processing system 302 and having observed the user making the obfuscated input, will still be unable to recreate the intended input by replaying the previously observed text or gestures because the obfuscation method will have changed at the next try, and data entry application 304 will receive an incorrect letter for the same gesture under a different obfuscation method.

Changing of character locations, read-out with a blank screen, random replacement of characters or words, requiring a variety of taps or touches, using timed touches or gestures, multi-key gestures, voice entries, and touch patterns described in the example obfuscation methods above are some examples of additional aspects according to the illustrative embodiments, which are mixed with or added to all or parts of the intended input. Furthermore, the above examples of obfuscation methods are not intended to be limiting on the illustrative embodiments. Those of ordinary skill in the art will be able to conceive many other obfuscation methods using this disclosure and the same are contemplated within the scope of the illustrative embodiments.

Additionally, the number of obfuscation methods, the combination of obfuscation methods, or both, can be changed in an embodiment. For example, one embodiment changes an obfuscation method depending on the environment in which the user may be present. For example, an embodiment can sense through a microphone that the user is in a noisy environment. Consequently, data entry application 304 decides to use a more complex obfuscation method than when the user is in quieter environment (therefore presumably in a location where few observers are proximate to the user).

Another embodiment can sense through a light sensor that the user is in a dark environment. Consequently, data entry application 304 decides to allow the use only those obfuscation methods that employ dark screens so that the light from the screen does not attract unwanted observers. An embodiment can make an obfuscation method user-specific such that data entry application 304 uses different obfuscation methods for different users of a common device.

An embodiment can also disallow use of certain obfuscation methods completely. An embodiment can disallow frequent reuse of an obfuscation method, such as by allowing an obfuscation method to be reused only after a predetermined number of entries. An embodiment can relax certain obfuscation methods, such as those requiring a particular touch pattern to accept an approximate pattern instead of an exact pattern. An embodiment may use different obfuscation methods or combinations thereof for different entry fields.

Figure 4:
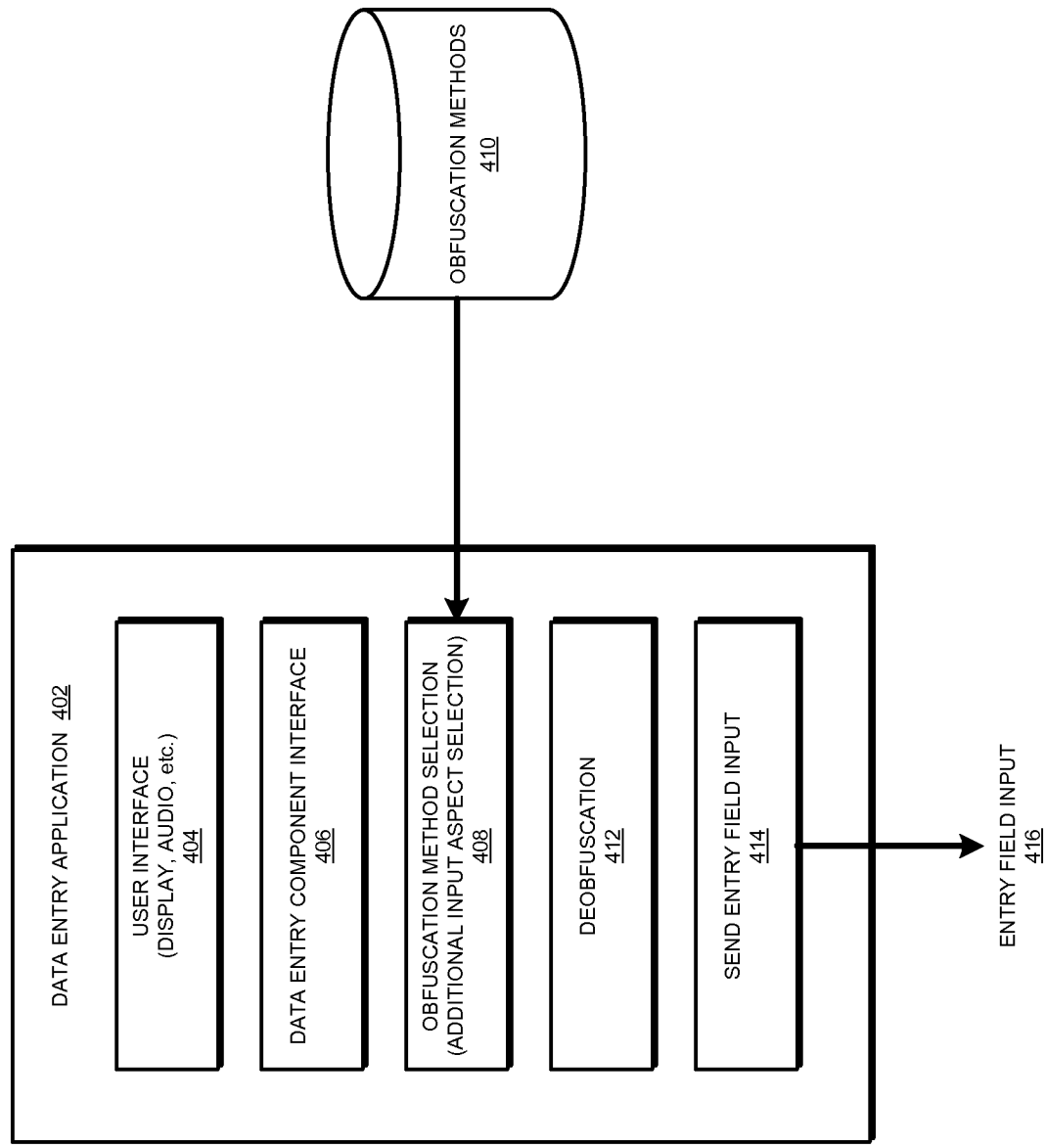
FIG. 4 depicts a block diagram of an example configuration of a data entry application in accordance with an illustrative embodiment.

With reference to FIG. 4, this figure depicts a block diagram of an example configuration of a data entry application in accordance with an illustrative embodiment. Data entry application 402 is usable as data entry application 304 in FIG. 3.

The depicted configuration is only an example manner of implementing the various functional components of data entry application 402. Those of ordinary skill in the art will be able to implement data entry application 402 in other ways to achieve similar functionality there from, and those alternate configurations are contemplated within the scope of the illustrative embodiments.

According to the depicted example configuration, data entry application 402 includes user interface component 404 to inform the user about the obfuscation methods to be used for a particular entry. User interface component 404 can inform the user using the data processing system's display, audio output capabilities, tactile or haptic interface, or other suitable data processing system functions.

Data entry component interface 406 interfaces with the data entry component of the data processing system where data entry application 402 may be executing. Data entry component interface 406 modifies the data entry component of the data processing system as needed according to the obfuscation method(s) selected. Data entry component interface 406 also accepts the obfuscated input that the user provides using the modified data entry component.

Obfuscation method selection component 408 selects one or more obfuscation rules from repository 410 of obfuscation methods. Obfuscation method selection component 408 can combine or serialize the application of more than one obfuscation methods as described above. Essentially, obfuscation method selection component 408 selects the additional aspects that are to be applied to the user inputs to obfuscate the user's intended input. These additional aspects provide the information needed for operating data entry component interface 406 and user interface component 404 in the manner described above.

Deobfuscation component 412 removes the additional aspects from the obfuscated input captured by data entry component interface 406. In other words, deobfuscation component 412 recovers the intended input from the obfuscated input and generates the entry field input expected by an application such as application 306 in FIG. 3. Send entry field input component 414 communicates entry field input 416 to such application.

Deobfuscation of a received obfuscated input, can involve other operations related to users and user inputs. For example, in one embodiment, deobfuscation component 412 implements authentication and authorization functions (collectively authorization functions, not shown), which can be used for determining whether the user or system providing the obfuscated input is authorized to do so, whether the obfuscated input is from an authorized user, whether the obfuscated input is provided in a manner consistent with the obfuscation methods employed, or a combination thereof. In another embodiment, deobfuscation component 412 calls authorization functions that may be provided by services or application (not shown) external to data entry application 402.

Figure 5:
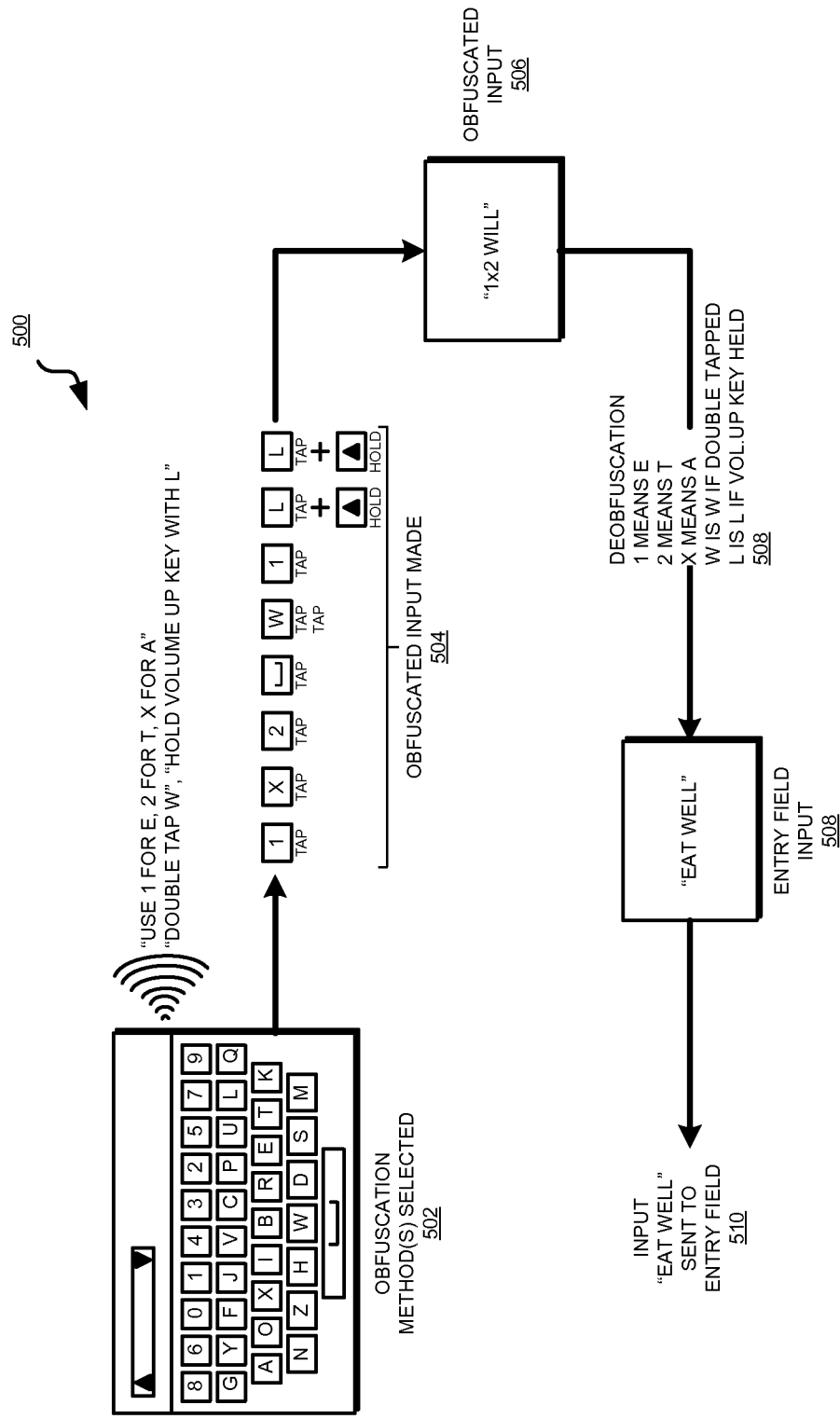
FIG. 5 depicts a process flowchart of an example obfuscation and deobfuscation using a data entry application in accordance with an illustrative embodiment.

With reference to FIG. 5, this figure depicts a process flowchart of an example obfuscation and deobfuscation using a data entry application in accordance with an illustrative embodiment. Process 500 can be implemented in data entry application 402 in FIG. 4.

Assume that obfuscation method selection component 408 in FIG. 4 selects following obfuscation methods 502 for a particular entry field—reorganize the keyboard, randomly replace certain characters, use multi-taps for certain characters, and use multi-key entry for certain characters. Accordingly, data entry component interface 406 in FIG. 4 reorganizes a soft keypad as depicted, user interface component 404 sends an audio message to the user suggesting the user to "use "1" instead of "E", "2" instead of "T", and "X" instead of "A"" among other similar replacements; and to "double tap for "W"" and to "hold the volume Up key simultaneously with "L"" along with other multi-tap and multi-key instructions.

Assume that a user or a system intends to provide an input including the phrase "EAT WELL". Obfuscated input made 504 according to selected obfuscation methods 502 include a single tap on "1", a single tap on "X", a single tap on "2", a single tap on the space-bar, a double tap on "W", a single tap on "1", a single tap on "L" simultaneously with holding the volume Up key, and another double tap on "W", a single tap on "1", a single tap on "L" simultaneously with holding the volume Up key. Obfuscated input received 506 at data entry component interface 406 in FIG. 4 is therefore, "1X2 WILL" (volume UP key holds are not depicted in obfuscated input 506, but can be recognized therewith with known technology).

Deobfuscation component 412 in FIG. 4 uses selected obfuscation methods 502 to create the deobfuscation logic where "1" means "E", "2" means "T", and "X" means "A"" among other similar replacements in obfuscated input 506; where "W" is recognized as "W" if a double tap on "W" is present in obfuscated input 506" and to "L" is recognized as "L" if the volume Up key was simultaneously held with "L". Accordingly, deobfuscation component 412 in FIG. 4 deobfuscates obfuscated input 506 and generates entry field input 508, which reads, "EAT WELL". Send component 414 in FIG. 4 sends 510 entry field input 508 to application 306 in FIG. 3.

Figure 6:
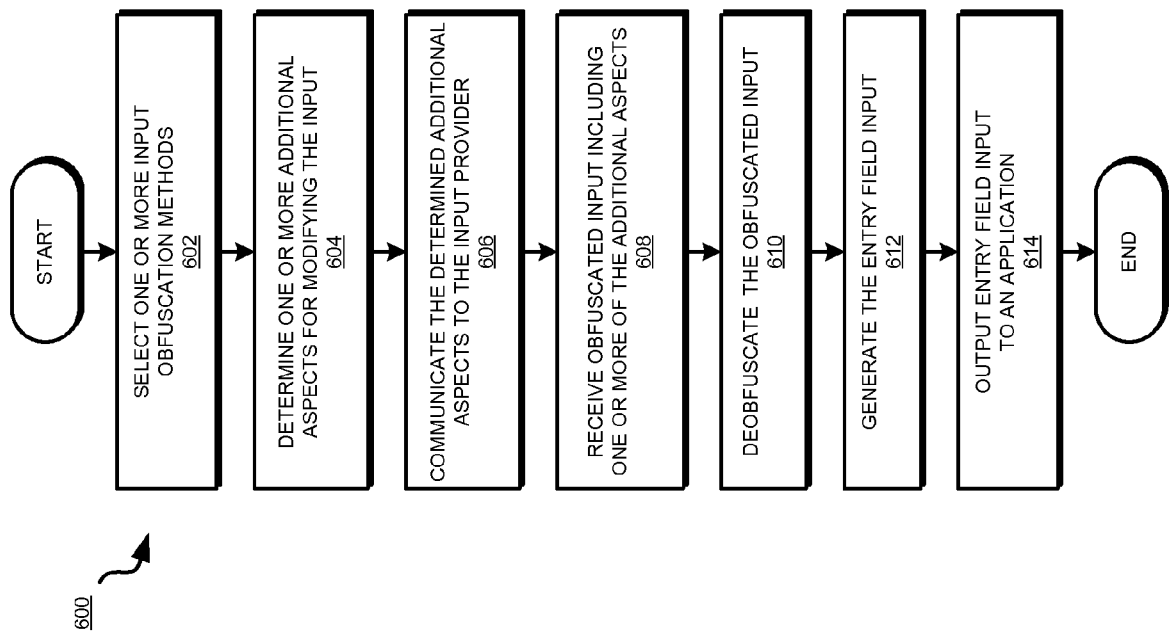
FIG. 6 depicts a flowchart of an example process of obfuscating entry of sensitive information in accordance with an illustrative embodiment.

With reference to FIG. 6, this figure depicts a flowchart of an example process of obfuscating entry of sensitive information in accordance with an illustrative embodiment. Process 600 can be implemented in data entry application 402 in FIG. 4.

Process 600 begins by selecting one or more obfuscation methods for an input (step 602). Process 600 determines one or more additional aspects for modifying the input (step 604). Process 600 communicates the determined additional aspects to the input provider user or system (step 606).

Process 600 receives an obfuscated input including one or more of the additional aspects (step 608). Process 600 deobfuscates the obfuscated input (step 610). Process 600 generates the entry field input that corresponds to the input contemplated by the provider in step 602 (step 612). Process 600 outputs the entry field input to an application (step 614). Process 600 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for obfuscating data entry. An embodiment can be implemented as a layer of logic between data input interface and data entry in entry fields of certain applications. An embodiment obfuscates sensitive information by allowing a user or system to produce one input pattern while entering unrelated data computed from the input pattern.

A provider of the input pattern can selectively use an embodiment for some entry fields and not others. An embodiment can offer a provider of the input pattern a choice of obfuscation methods, or may select a conversion rule automatically and communicate the selection to the provider. An embodiment can be implemented in conjunction with other data security features, such as biometrics, and other methods. For example, an embodiment can use location awareness through Global Positioning System (GPS) location of the user to determine whether the user is in a secure location and to determine whether to use strong or lax obfuscation methods.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or compute readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for obfuscating entry of information, the method comprising:
    communicating to a provider of an input a set of additional aspects to be applied to a part of the input, wherein the set of additional aspects is distinct from a second set of additional aspects to be applied to another input;
    receiving, from the provider, an obfuscated input corresponding to the part of the input, wherein a subset of the set of additional aspects is present in the obfuscated input;
    recovering the part of the input from the obfuscated input by removing, using a processor and a memory, the subset of the set of additional aspects from the obfuscated input, forming a recovered part;
    generating an entry field input corresponding to the input using the recovered part; and
    sending the entry field input to an application executing in a data processing system.

2. The computer implemented method of claim 1, wherein the another input is a second part of the input, wherein the set of additional aspects is communicated to the provider prior to the provider beginning to provide the input, and wherein the second set of additional aspects is communicated to the provider after the provider begins to provide the input but before the provider provides the second part of the input.

3. The computer implemented method of claim 1, wherein the another input is the input as provided by a second provider at a different time.

4. The computer implemented method of claim 1, further comprising:
    selecting a set of obfuscation methods, wherein the selecting comprises:
    receiving a sensor input, the sensor input corresponding to an ambient condition of the provider; and
    selecting an obfuscation method to include in the set of obfuscation methods that accounts for the ambient condition; and
    combining the obfuscation methods in the set of obfuscation methods to determine the set of additional aspects.

5. The computer implemented method of claim 1, wherein an additional aspect in the set of additional aspects is provided by a data processing system.

6. The computer implemented method of claim 5, wherein a character corresponding to a character input key of a data entry component of the data processing system forms the part of the input, wherein the additional aspect includes multiple interactions with the character input key of the data entry component of the data processing system for the character corresponding to the character input key to be accepted as the part of the input.

7. The computer implemented method of claim 6, wherein the character is a whole word, and an interaction in the multiple interactions with the character input key results in reading out the whole word in an audio output to the provider.

8. The computer implemented method of claim 6, wherein the multiple interactions comprise a combination of tapping, swiping, and drawing a pattern on the character input key, and wherein a second patter approximating the pattern is accepted as an acceptable interaction in the multiple interactions.

9. The computer implemented method of claim 5, wherein the additional aspect includes
    making a data entry component of the data processing system visually inaccessible, announcing a character corresponding an invisible key of the visually inaccessible data entry component responsive to the provider gesturing proximate to the invisible key, receiving a second gesture at a location of the gesture, and selecting the character responsive to the second gesture at the location.

10. The computer implemented method of claim 5, wherein the additional aspect includes making a data entry component of the data processing system visually inaccessible, announcing a set of characters in a predetermined order, receiving a gesture at the data entry component within a predetermined interval from announcing a character in the set of characters, and selecting the character responsive to the gesture.

11. The computer implemented method of claim 1, wherein the data processing system accepts the part of the input by accepting an interaction of the provider with a character input key of a data entry component of the data processing system, and wherein the data processing system accepts a second part of the input via a voice entry from the provider.

12. The computer implemented method of claim 1, wherein an additional aspect in the set of additional aspects is added to the input by the provider upon receiving communication of the set of additional aspects from a data processing system.

13. The computer implemented method of claim 12, wherein the additional aspect includes reading out to the provider a character under an invisible key of a data entry component of the data processing system.

14. The computer implemented method of claim 12, wherein the additional aspect includes randomly replacing a character with a different character.

15. The computer implemented method of claim 12, wherein the additional aspect includes modifying the part of the input using a second part of the input.

16. The computer implemented method of claim 12, wherein the additional aspect includes a multi-finger gesture relative to a key of a data entry component of the data processing system for using a character corresponding to the key.

17. The computer implemented method of claim 12, wherein the additional aspect includes multiple gestures a predetermined interval apart, relative to a key of a data entry component of the data processing system, for using a character corresponding to the key.

18. The computer implemented method of claim 12, wherein the additional aspect includes gestures relative to multiple keys of a data entry component of the data processing system for using a character corresponding to one of the multiple keys.

19. The computer implemented method of claim 12, wherein the additional aspect is excluded from reuse in conjunction with a second part of the input.

20. A computer usable program product comprising a computer usable storage device including computer usable code for obfuscating entry of information, the computer usable code comprising:

computer usable code for communicating to a provider of an input a set of additional aspects to be applied to a part of the input, wherein the set of additional aspects is distinct from a second set of additional aspects to be applied to another input;

computer usable code for receiving, from the provider, an obfuscated input corresponding to the part of the input, wherein a subset of the set of additional aspects is present in the obfuscated input;

computer usable code for recovering the part of the input from the obfuscated input by removing, using a processor and a memory, the subset of the set of additional aspects from the obfuscated input, forming a recovered part;

computer usable code for generating an entry field input corresponding to the input using the recovered part; and computer usable code for sending the entry field input to an application executing in a data processing system.

21. The computer usable program product of claim 20, wherein the computer usable code is stored in a computer readable storage medium in a data processing system, and wherein the computer usable code is transferred over a network from a remote data processing system.

22. The computer usable program product of claim 20, wherein the computer usable code is stored in a computer readable storage medium in a server data processing system, and wherein the computer usable code is downloaded over a network to a remote data processing system for use in a computer readable storage medium associated with the remote data processing system.

23. A data processing system for obfuscating entry of information, the data processing system comprising:

a storage device including a storage medium, wherein the storage device stores computer usable program code; and a processor, wherein the processor executes the computer usable program code, and wherein the computer usable program code comprises:

computer usable code for communicating to a provider of an input a set of additional aspects to be applied to a part of the input, wherein the set of additional aspects is distinct from a second set of additional aspects to be applied to another input;

computer usable code for receiving, from the provider, an obfuscated input corresponding to the part of the input, wherein a subset of the set of additional aspects is present in the obfuscated input;

computer usable code for recovering the part of the input from the obfuscated input by removing, using a processor and a memory, the subset of the set of additional aspects from the obfuscated input, forming a recovered part;

computer usable code for generating an entry field input corresponding to the input using the recovered part; and computer usable code for sending the entry field input to an application executing in a data processing system.

* * * * *